(12) United States Patent
Arkko et al.

(10) Patent No.: US 8,000,704 B2
(45) Date of Patent: Aug. 16, 2011

(54) FAST NETWORK ATTACHMENT

(75) Inventors: Jari Arkko, Kauniainen (FI); Pekka Nikander, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 361 days.

(21) Appl. No.: 11/573,831

(22) PCT Filed: Aug. 20, 2004

(86) PCT No.: PCT/EP2004/051871
§ 371 (c)(1),
(2), (4) Date: Feb. 23, 2007

(87) PCT Pub. No.: WO2006/018045
PCT Pub. Date: Feb. 23, 2006

(65) Prior Publication Data
US 2007/0242638 A1 Oct. 18, 2007

(51) Int. Cl.
*H04M 1/66* (2006.01)
*H04M 1/68* (2006.01)
*H04M 3/16* (2006.01)
*H04W 4/00* (2009.01)
*H04L 9/32* (2006.01)

(52) U.S. Cl. ............ 455/435.1; 455/411; 370/338; 713/168

(58) Field of Classification Search ........... 455/411, 455/435.1; 370/338, 339, 401, 410, 352; 713/168
See application file for complete search history.

(56) References Cited

U.S. PATENT DOCUMENTS

| 6,353,891 | B1 * | 3/2002 | Borella et al. | 726/12 |
| 7,286,510 | B2 * | 10/2007 | Wang et al. | 370/338 |
| 2002/0172207 | A1 * | 11/2002 | Saito et al. | 370/400 |
| 2003/0026230 | A1 * | 2/2003 | Ibanez et al. | 370/338 |
| 2003/0084293 | A1 * | 5/2003 | Arkko et al. | 713/168 |
| 2003/0091030 | A1 * | 5/2003 | Yegin et al. | 370/352 |

(Continued)

FOREIGN PATENT DOCUMENTS

JP 2003-8625 1/2003

(Continued)

OTHER PUBLICATIONS

Lee et al., "Mobile IP and WLAN with AAA authentication protocol using Identity-based Cyyptography", Apr. 2, 2003, Telecommunications, ICT 2003, 10th International Conference, vol. 1. pp. 597-603.*

(Continued)

*Primary Examiner* — Jinsong Hu
*Assistant Examiner* — Opiribo Georgewill

(57) ABSTRACT

A method of facilitating Internet Protocol access by a mobile node to an access Network, the method comprising: sending an attachment request from the mobile node to an access router of the access network, the request containing a mobile node identifier and an Interface Identifier or means for deriving an Interface Identifier, and being signed by the mobile node to allow the message to be authenticated as originating at that mobile node; receiving the request at the access router and authenticating the message there using the signature, and in response to the receipt and authentication of the message, performing a predefined set of tasks delegated to the access node and which are required to facilitate said access; and returning an acknowledgment from the access router to the mobile node confirming the access permission, the acknowledgement containing a network routing prefix and means for authenticating the access router to the mobile node.

7 Claims, 2 Drawing Sheets

U.S. PATENT DOCUMENTS

2003/0104814 A1 * 6/2003 Gwon et al. .................. 455/436
2004/0047322 A1 * 3/2004 O'Neill ......................... 370/338
2004/0081122 A1 * 4/2004 Koodli et al. ................. 370/329

FOREIGN PATENT DOCUMENTS

WO        WO 01/76134 A      10/2001
WO      WO 2004030309 A2 * 4/2004

OTHER PUBLICATIONS

Lee et al., "Mobile IP and WLAN with AAA Authentication Protocol using Identity-based Cryptography", Apr. 2, 2003, Telecommunications, ICT 2003, 10th International Conference, vol. 1. pp. 597-603.*

Schmid et al., "Component-based Active Networks for Mobile Multimedia Systems", Jun. 200, In Proceedings of NOSSDAV.*

Arkko et al., "Delegation of Signalling Rights", Security Protocols, Lectures Notes in Computer Science, 2003, vol. 2845/2003, 575-586.*

Jacob S et al: "Security of current mobile IP solutions" Milcom 97 Proceedings Monterey, CA, USA Nov. 2-5, 1997, New York, NY, USA, IEEE, US, vol. 3, Nov. 2, 1997, pp. 1122-*1128, XP010260752 ISBN: 0-7803-4249-6 the whole document.

* cited by examiner

FAST NETWORK ATTACHMENT

FIELD OF THE INVENTION

The present invention relates to a fast network attachment mechanism for a mobile wireless network.

BACKGROUND OF THE INVENTION

In the context of a mobile wireless communication network, the term "attachment" refers to the procedure whereby a user device connects to a local wireless network (such as a wireless LAN access point) and is able to make use of at least some of the services offered by that network. In practice, this procedure involves multiple protocol layers relating, for example, to the identification of the correct radio frequencies, radio-layer negotiation to enable communications with the access point, network access authentication and authorization procedures, link layer security protection initiation, finding the routers and addresses at the IP layer, and reestablishing mobility mechanisms to a new IP address. Unfortunately, these tasks take time to complete, and the interaction and overall effects of the individual tasks are not well understood, because most of the work on wireless access issues has focused only on a particular aspect.

An area likely to suffer in particular from a failure to inter-relate multiple protocol issues is that of mobility between different network types. For example, researchers in this area have tended to ignore the effects of having to have access control on the link (necessary due to business and/or legal requirements). Real users are only about to start taking advantage of mobility between different network types and the associated problems have therefore not been fully seen or appreciated.

Mobile IP is a set of protocols which provide for the roaming of subscribers between access networks, whilst at the same time ensuring that the subscribers are reachable by correspondent nodes that do not know the current locations of the subscribers. FIG. 1 illustrates schematically a network architecture for implementing Mobile IP. A subscriber 1 is attached to an access router 2 of an access network 3. Fundamental to Mobile IP is the provision of a Home Agent 4 in a subscriber's home network 5 and which knows the current location of the subscriber 1 (the current location being defined by an IP address known as a "care-of-address") and is able to route messages directed to the subscriber's fixed IP address to the current location. Binding update messages are used to enable the subscriber 1 to update his care-of-address at the Home Agent 4, e.g. in the event that the subscriber roams to a new access network. When a subscriber changes its care-of-address, a route optimisation procedure may be invoked to ensure that packets subsequently sent from correspondent hosts 6 attached to respective access networks 7 are routed to the subscriber via the optimal route. An Authentication, Authorisation, and Accounting (AAA) server 8 located in the home network 5 communicates with the Home Agent 4.

In the case of Internet Protocol version 6 (IPv6), the process for network attachment in a typical wireless link is as follows:
  Link layer attachment, such as detecting and connecting to a specific Wireless Local Area Network (LAN) access point.
  Access control procedures. Mechanisms such as 802.1X and EAP are used for this. Typically, this involves three EAP control messages (identity request, response, and success, piggybacked on the EAPOL-Success message), and a specific authentication method. Simple authentication methods complete in two messages, but many methods require more.
  Router Discovery. This is the process of finding the default router for the node and determining the routing prefixes for this link. In the simplest case this requires two messages, with a waiting period in between.
  Duplicate Address Detection (DAD). This is used to ensure that the address that the mobile node selects for use on this link is unique. Typically, this involves one message and a waiting period.
  Mobility management procedures. These include messaging with a Home Agent and possibly with correspondent nodes and a previous router. The messaging consists typically of two messages with the exchanged between the user terminal and the Home Agent, five (partially simultaneous) messages with each correspondent node, and a message with the previous router.

Internet Protocol version 4 (IPv4) behaves largely in the same manner as IPv6. However, Router Discovery, Neighbour Discovery, and address autoconfiguration are replaced with the Dynamic Host Control Protocol (DHCP), and there is no support for DAD. DHCP typically requires four messages. Mobile IPv4 does not have route optimisation, and therefore involves only two additional mobility related messages. There is no support in IPv4 for a smooth handover from an old to a new access router.

In summary, with IPv6 there are at least 16 messages in the full case assuming only one correspondent node, and two distinct waiting periods (although four of the messages can be sent in parallel). In the IPv4 case, the number of messages is somewhat smaller due to the lesser functionality of IPv4 and the central role of DHCP. However, at least 11 messages are still needed.

Work is ongoing to try to optimise some of the signalling procedures discussed above. In particular:
  So-called "Optimised" DAD attempts to avoid delays associated with DAD, and may also enable the use of the tentative address before DAD has completed. The potential benefit of this approach is the elimination of one waiting period, and possible additional parallelism in the messaging sequence. Another proposed approach uses the access router to assist in the DAD procedure.
  Optimised Movement Detection attempts to make it faster to detect when movement (of a user terminal) has occurred, and to identify the network parameters in the new network. This involves new algorithms for the reduction of the waiting periods associated with IPv6 Router Advertisements, but does not reduce the overall amount of messages.
  Hierarchical Mobile IP (HMIP) attempts to localise movements so that the number of location updates sent to the Home Agent and the correspondent nodes can be minimized.

These optimisation approaches are mainly concerned with the elimination of unnecessary waiting times. They do not appear to have a significant impact on the amount of required signalling, with the except of HMIP. HMIP does not, however, reduce the amount of basic network access signalling, it only shortens the path that this signalling needs to take.

SUMMARY OF THE INVENTION

It is an object of the present invention to reduce the number of messages required to facilitate network access of a mobile node. This is achieved by securely delegating certain tasks, currently performed by the mobile node, to an access router of the access network.

It is an object of the invention to provide a so-called delegation-based security scheme which, rather than sending messages end-to-end between the mobile node and whatever core network entity it needs to talk to, sends certificates from the mobile node to an access router that delegate some of the tasks to the access router which would otherwise have to be done by the mobile node.

According to a first aspect of the present invention there is provided a method of facilitating Internet Protocol access by a mobile node to an access network, the method comprising:

sending an attachment request from the mobile node to an access router of the access network, the request containing a mobile node identifier and an Interface Identifier or means for deriving an Interface Identifier, and being signed by the mobile node to allow the message to be authenticated as originating at that mobile node;

receiving the request at the access router and authenticating the message there using the signature, and in response to the receipt and authentication of the message, performing a predefined set of tasks delegated to the access node and which are required to facilitate said access; and returning an acknowledgment from the access router to the mobile node confirming the access permission, the acknowledgement containing a network routing prefix and means for authenticating the access router to the mobile node.

Application of the present invention can result in a significant reduction in the number of signalling messages required to provide network attachment for a mobile node, by applying a holistic approach rather than by focusing on particular protocols and tasks. It improves the prospects for near seamless roaming between access networks.

Preferably, the attachment request contains one or more of the following:

the mobile node's Network Access Identifier (NAI), the mobile node's own public key,
a trusted root for any access router the mobile node is willing to accept,
an address of the mobile node's Home Agent,
addresses of correspondent nodes which the mobile node wishes to establish route optimisation with,
an Interface Identifier (IID), constructed in a Cryptographically Generated Address (CGA) manner,
the identity of the access router (if known),
desired parameters for the wireless link connection (if needed),
a cookie, calculated in a manner known only by the mobile node,
a signature, signed with the mobile node's private key.

Preferably, receipt of the attachment request at the access router triggers one or more of the following procedures at the access router:

Link layer attachment;
An access control procedure;
Router discovery;
IP address generation:
Duplicate address detection Preferably, said predefined set of tasks comprise:

Implementing an Access, Authorisation, and Accounting procedure with appropriate infrastructure (AAA server) in the home network of the mobile node;
Performing a binding update on behalf of the mobile node with a Home Agent of the mobile node;
Performing route optimisation with one or more correspondent nodes of the mobile node.

According to a second aspect of the present invention there is provided a method of operating a mobile node to facilitate Internet Protocol access by the mobile node to an access network, the method comprising sending an attachment request from the mobile node to an access router of the access network, the request containing a mobile node identifier and an Interface Identifier or means for deriving an Interface Identifier, and being signed by the mobile node to allow the message to be authenticated as originating at that mobile node, the message containing authorisation for the access router to perform a predefined set of tasks delegated to the access node and which are required to facilitate said access According to a third aspect of the present invention there is provided a method of operating an access router arranged to facilitate Internet Protocol access by a mobile node to an access network, the method comprising:

receiving the request at the access router and authenticating the message there using the signature, and in response to the receipt and authentication of the message, performing a predefined set of tasks delegated to the access node and which are required to facilitate said access; and
returning an acknowledgment from the access router to the mobile node confirming the access permission, the acknowledgement containing a network (routing) prefix and means for authenticating the access router to the mobile node.

According to a fourth aspect of the present invention there is provided a method of operating a Home Agent arranged to implement Mobile Internet Protocol for a mobile node, the method comprising:

receiving a location update message for the mobile node from an access router;
authorising the access router to perform a location update on behalf of the mobile node; and
implementing the location update.

DETAILED DESCRIPTION OF CERTAIN EMBODIMENTS

Figure 1:
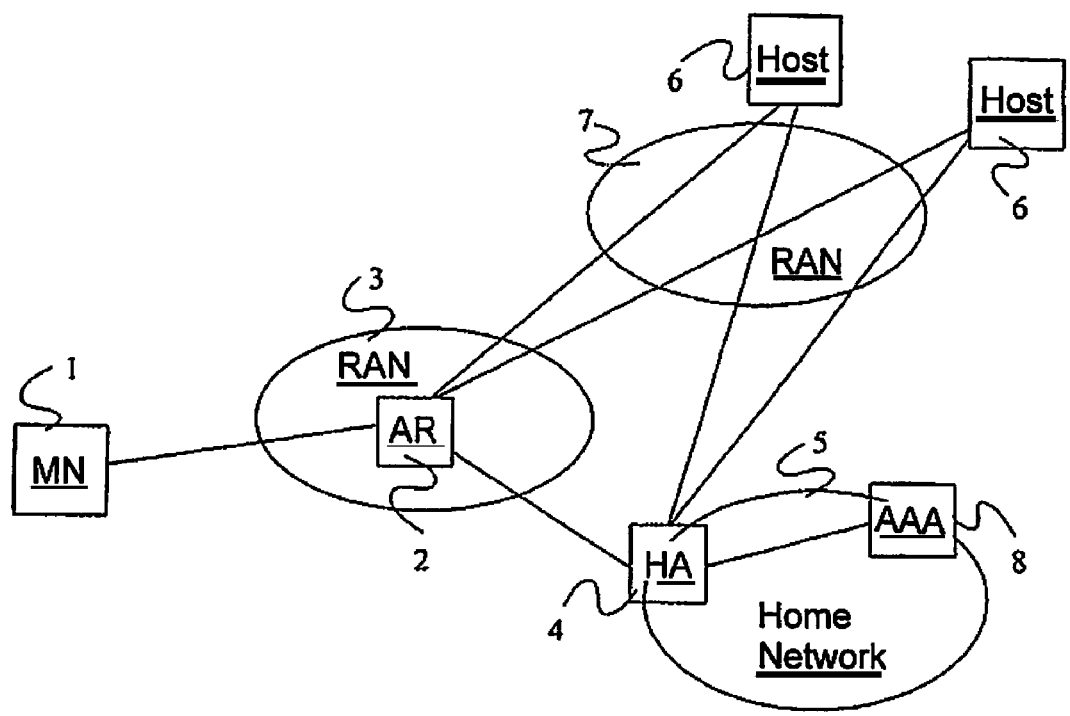
FIG. 1 illustrates schematically a mobile communication system architecture employing Mobile IP.

In optimising the network attachment procedure for a mobile node, a number of basic requirements must be taken into account. From the point of view of the mobile node, the mobile node needs to prove to the access network that it has an access right. It also needs to prove to the Home Agent that it has a right to update its binding information stored there, and to the correspondent nodes that it is reachable at the home and care-of addresses. Finally, the mobile node needs to prove to other nodes in the visited network that it "owns" its care-of address. Other requirements are:

The local router needs to prove its authority to the mobile node, both in terms of access authentication and ability to act as a router.
The Access, Authorisation, and Accounting (AAA) infrastructure needs to have proof that the mobile node is who it claims to be (to ensure security and confirm that payment will be forthcoming).
The Home Agent needs to have a proof that the mobile node has indeed requested a location update.

The efficient network attachment procedure proposed here relies upon the following constructs:

- A single request (along with its associated credentials) for network access can be used to acquire the necessary permission from the access router, Home Agent, and optionally AAA infrastructure.
- The creation of an address for a mobile node can be performed in two steps by separate nodes: the mobile node can create the Interface Identifier (IID) part of the address and assure its ownership of the IID through Cryptographically Generated Addresses (see GB2367986) or EUI-4 address certificates. The access router can create the prefix part of the address.
- Home Agents (or home AAA servers) can act on behalf of the mobile nodes to verify the trust towards the access router, and the correctness of the care-of address construction.
- Home Agents can act on behalf of the mobile nodes to acquire home "keygen" tokens which are the cryptographic values required for performing route optimisation with correspondent nodes.
- Similarly, the access router can act on behalf of the mobile nodes for acquiring care-of keygen tokens.
- Denial-of-Service attack prevention only needs to be employed when the involved nodes are under an attack, otherwise the prevention procedures cause only extra delay.

There are a number of different ways to create a wireless link protocol based on the above constructs. One solution consists of the following messaging sequence:

1. On some types of link layers, it may be possible for the mobile node to receive an announcement or "beacon" message before it attempts attachment. Where such a message is available, it contains the following information:
   the identity of the access router, and
   optionally, the capabilities and properties of the access router.
2. When the mobile node is ready to attach to a link, it sends a "new attachment message" to the appropriate access router. This message is a signed statement from the mobile node, perhaps in the form of a certificate. The statement indicates that the mobile node wishes to gain access, and contains the following information:
   the mobile node's Network Access Identifier (NAI),
   the mobile node's own public key,
   a trusted root for any access router the mobile node would accept,
   the address of the mobile node's Home Agent,
   the addresses of the correspondent nodes which the mobile node wishes to establish route optimisation with,
   an Interface Identifier (IID), constructed in a Cryptographically Generated Address (CGA) manner,
   the identity of the access router (if known),
   the desired parameters for the wireless link connection (if needed),
   a cookie, calculated in a manner known only by the mobile node,
   a signature, signed with the mobile node's private key.
3. Once the access router has verified the access request (details of this are discussed later), it sends an acknowledgement to the mobile node and allows it to access the network. This acknowledgement is a signed statement from the access router that it has performed the tasks delegated to it. In addition, the acknowledgement carries a signed statement from the home AAA network that it has registered the access request and verified that the access network is trusted. The acknowledgement carries a similar signed statement from the mobile node's Home Agent that it has registered the new location of the mobile node, and also verified that the access router is trusted. The acknowledgement contains the following information:
   the cookie from the mobile node,
   the network prefix allocated for the mobile node,
   the identity and public key of the access router,
   a signature of the access router,
   a signature of the user's home AAA network, and
   a signature of the user's Home Agent.
4. The mobile node verifies that the cookie contained within the acknowledgement was produced by itself, and verifies the signatures in the message (to do this it may use known public keys). Assuming that the signatures are correct, the mobile node starts sending data packets.
5. Once the access router, Home Agent, and a correspondent node have concluded the necessary mobility signalling needed to establish route optimisation, the access router sends a message to the mobile node, containing the following information:
   the cookie from the mobile node,
   the address of the correspondent node,
   a signature of the access router.
6. The mobile node again verifies that the cookie contained within this message was produced by itself, and verifies the signature in the message. Assuming that the information is correct, the mobile node proceeds to use route optimisation in the data packets it sends to the correspondent node in question.

Once this process is complete, the mobile node has been authenticated to the local network (with possible accounting records created), has registered with its Home Agent, and has registered with all of its correspondent nodes.

Data packets may flow when the mobile node has (a) received an acknowledgement from the access router that all steps 1. to 6. have been performed, (b) received at least the prefix information in which case it could (optimistically) start sending data, or (c) immediately if the access router "fills in" the prefix part of the source IP address in the mobile node's packets.

The use of a single request—response message pair with public key cryptography has potentially a Denial-of-Service (DoS) vulnerability. An attacker might generate a large number of requests, and the receiver, e.g. the access router, must perform a lot of computations before it can determine that the requests are invalid. The normal defence taken against this DoS attack is the exchange of some (weakly) verified packets before the actual heavy computations occur. For instance, the Internet Key Exchange (IKE) procedure exchanges cookies and verifies that the peer can in fact receive packets at the claimed IP address before it performs either Diffie-Hellman or RSA computations.

A similar defence may be used in the procedure described here (typically involving the sending of a cookie from the access network to the mobile node, and the inclusion of this cookie in the initial access request sent by the mobile node), but in order to avoid a delay for a relatively rare problem, the involved nodes do not normally invoke the extra exchange. Rather, they invoke it only when they consider themselves to be under a heavy load or a potential Denial-of-Service attack. Specifically, in such a situation, the access router or the infrastructure behind it can decline to verify the signatures immediately. Instead it can send a preliminary response message containing the original message and the sender's cookie, and attach its own cookie. If the request was real, the sender will receive this message and respond by resending the request with the additional cookie from the preliminary response message. This ensures that at least the node in question exists in a known IP address, and is able to send and receive packets. In this case the signalling sequence is as follows:
1. The mobile node sends a "new attachment message" when it attaches to a new link.
2. The access router or an infrastructure node behind it requests additional verification. The message contains the following information:
   the cookie from the mobile node,
   the cookie(s) from the access router (and infrastructure) node(s).
3. The mobile node verifies that the cookie contained within it was produced by itself, and resends its original request with one additional parameter, namely the cookie(s) from the access router (and infrastructure) node(s).
4. From this point onwards, the process continues as described above.

The infrastructure part of the network attachment procedure may be implemented in a number of different ways, depending on whether new protocols can be employed or existing ones reused. In the following we give only an overview of providing the desired functionality at the access router, and how it can contact the AAA infrastructure, Home Agent, and correspondent nodes, using existing protocols.
1. The AAA infrastructure can be contacted using existing authentication mechanisms. For instance, the access router could run EAP-TLS inside a RADIUS protocol, and use its own key for the client TLS authentication. By including the mobile node's signed access request in certificate form, the AAA infrastructure can determine that the mobile node has delegated the authentication task to the access router.
2. The access router can verify the IID sent by the mobile node either by keeping its own database of currently used IIDs on this link, or by sending an IPv6 DAD request on the link on behalf of the mobile node.
3. The access router can authenticate itself to the mobile node's Home Agent by using its own public key, and as above, include the mobile node's signed request as a certificate. In addition, the access router can provide the network prefix information. The Home Agent can then determine the new location, and verify that the mobile node really has made the request to be moved. Depending on whether the mobile node knew the identity of the access router before it made its request, the Home Agent may also be able to check that the mobile node, access router, and Home Agent all agree about the identity of the access router.
4. Once the access router has received an answer from both the AAA infrastructure and the Home Agent, and has verified the received cookies and signatures, it can proceed by sending an acknowledgement to the mobile node and allowing it to access the network.
5. When the Home Agent has approved the access request, it can, in parallel, send a number of Mobile IPv6 home test "init" messages to the listed correspondent nodes. Similarly, the access router can send a number of care-of test "init" messages to the same correspondent nodes. The responses to the Home Test messages will be sent to the access router from the Home Agent. When both Home and Care-of Test messages have been responded to, the access router can combine the values from them to send a Binding Update to the correspondent node. (Unlike other nodes involved in this exchange, the correspondent node does not need the signed statements, as it operates solely based on address reachability tests, which succeed due to the Home Agent and access router performing them.)

Figure 2:
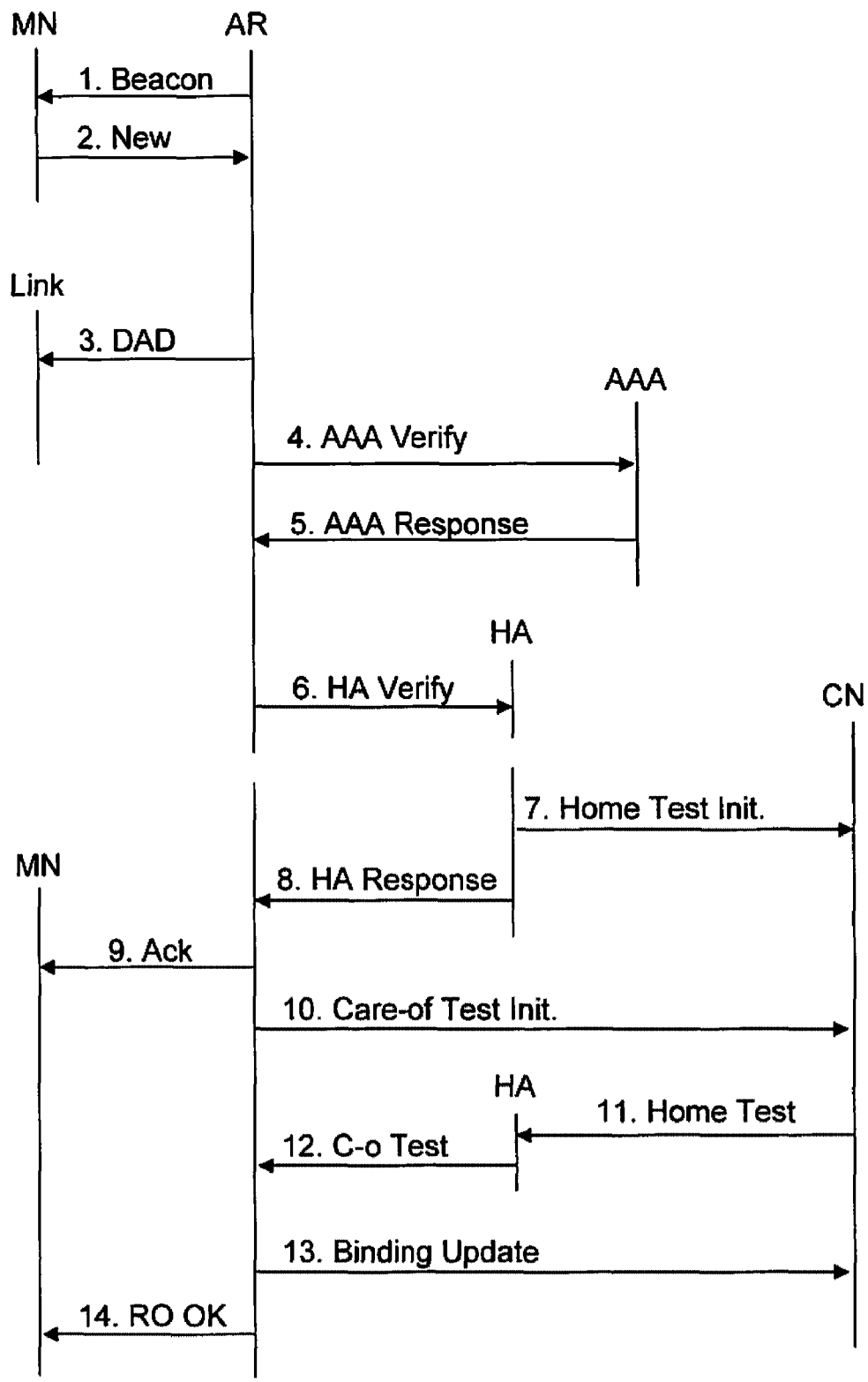
FIG. 2 shows signalling associated with a fast network attachment procedure.

A summary of the message flow is illustrated in FIG. 2.

It will be appreciated that the procedure illustrated can be optimised still further by including the parallel invocation of messages to the different infrastructure nodes.

The presented model can also act as a link-layer (wireless link) security mechanism, for instance, to enable encryption between the host and the access router. The necessary cryptographic exchange for deriving the needed session keys can be embedded in the "new attachment message" and its acknowledgement. For example, a Diffie-Hellman exchange can be carried out in order to securely agree on the session keys.

In its minimal form, the procedure described here provides for a secure single message network attachment mechanism on the wireless link, assuming of course that data packets can be sent optimistically before an acknowledgement has been received. In any case, the described mechanism requires at most 3 messages on the wireless link to perform network attachment for a mobile node.

It will be appreciated by the person of skill in the art that various modifications may be made to the above described embodiments without departing from the scope of the present invention.

The invention claimed is:

1. A method of reducing the number of messages required for a visiting mobile node to access a network through an access network utilizing Internet Protocol version 6 (IPv6), the method comprising:
   receiving at an access router of the access network, an attachment request message from the mobile node, the request message including:
      a mobile node identifier;
      the mobile node's public key;
      an Interface Identifier part of an IPv6 address for the mobile node without a prefix part of the IPv6 address, wherein the Interface Identifier part of the IPv6 address is created by the mobile node, which verifies its ownership of the Interface Identifier through Cryptographically Generated Addresses (CGA);
      an address of the mobile node's Home Agent;
      a cookie calculated in a manner known only to the mobile node; and
      a signature signed with the mobile node's private key;
   verifying by the access router:
      that the mobile node is authorized to use the access network;
      that the mobile node is authorized to use the Home Agent; and
      that the Interface Identifier is available in the access network;
   creating by the access router, the prefix part of the mobile node's IPv6 address; and
   sending an acknowledgment message from the access router to the mobile node granting access to the network, the acknowledgment message including:
      the cookie from the mobile node;
      an identifier and a public key of the access router;
      a signature of the access router; and
      one or more signed statements indicating that a signer has registered the mobile node's request, and that the signer has verified that the access network is trusted.

2. The method according to claim 1, wherein the step of verifying by the access router that the mobile node is authorized to use the access network includes receiving at the access router, a signed statement from the mobile node's home Authentication, Authorization, and Accounting (AAA) network indicating the home AAA network has registered the access request.

3. The method according to claim 1, wherein the step of verifying by the access router that the mobile node is authorized to use the Home Agent includes receiving at the access router, a signed statement from the mobile node's Home Agent indicating the Home Agent has registered the new location of the mobile node.

4. The method according to claim 1, wherein the step of verifying by the access router that the Interface Identifier is available includes sending an IPv6 Duplicate Address Detection (DAD) request toward the network on behalf of the mobile node.

5. The method according to claim 1, wherein the step of verifying by the access router that the Interface Identifier is available includes checking a database of Interface Identifiers at the access router.

6. The method according to claim 1, wherein the signed statements include a signed statement from the mobile node's home Authentication, Authorization, and Accounting (AAA) network indicating the home AAA network has registered the access request and verified that the access network is trusted.

7. The method according to claim 1, wherein the signed statements include a signed statement from the mobile node's Home Agent indicating the Home Agent has registered the new location of the mobile node and has verified that the access router is trusted.

* * * * *

UNITED STATES PATENT AND TRADEMARK OFFICE
CERTIFICATE OF CORRECTION

PATENT NO. : 8,000,704 B2  Page 1 of 1
APPLICATION NO. : 11/573831
DATED : August 16, 2011
INVENTOR(S) : Arkko et al.

It is certified that error appears in the above-identified patent and that said Letters Patent is hereby corrected as shown below:

On the Title Page, in Field (56), under "OTHER PUBLICATIONS", in Column 2, Line 2, delete "Cyyptography"" and insert -- Cryptography" --, therefor.

Title Page 2, in Field (56), under "OTHER PUBLICATIONS", in Column 1, Lines 1-3, delete "Lee at al., "Mobile.........pp.597-603.*".

Title Page 2, in Field (56), under "OTHER PUBLICATIONS", in Column 2, Line 2, delete "Jun. 200," and insert -- Jun. 2000, --, therefor.

In Fig. 1, Sheet 1 of 2, delete " 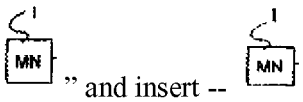 " and insert -- -- , therefor.

In Column 1, Line 62, delete "(LAN)" and insert -- (WLAN) --, therefor.

In Column 3, Line 60, delete "generation:" and insert -- generation; --, therefor.

In Column 3, Line 61, delete "detection" and insert -- detection. --, therefor.

In Column 5, Line 12, delete "EUI-4" and insert -- EUI-64 --, therefor.

Signed and Sealed this
Twenty-seventh Day of December, 2011

David J. Kappos
*Director of the United States Patent and Trademark Office*